United States Patent
Park et al.

(10) Patent No.: US 11,565,706 B2
(45) Date of Patent: Jan. 31, 2023

(54) METHOD AND APPARATUS FOR CONTROLLING TERRAIN MODE USING ROAD CONDITION JUDGEMENT MODEL BASED ON DEEP LEARNING

(71) Applicant: HYUNDAI MOBIS CO., LTD., Seoul (KR)

(72) Inventors: Sin Gi Park, Suwon-si (KR); Kwon Hee Lee, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 0 days.

(21) Appl. No.: 17/409,333

(22) Filed: Aug. 23, 2021

(65) Prior Publication Data

US 2022/0063630 A1    Mar. 3, 2022

(30) Foreign Application Priority Data

Aug. 26, 2020   (KR) .................. 10-2020-0107699

(51) Int. Cl.

| | |
|---|---|
| *B60W 40/068* | (2012.01) |
| *B60W 30/182* | (2020.01) |
| *B60W 30/02* | (2012.01) |
| *B60W 50/14* | (2020.01) |
| *G05B 13/02* | (2006.01) |
| *G06V 20/56* | (2022.01) |

(52) U.S. Cl.
CPC .......... *B60W 40/068* (2013.01); *B60W 30/02* (2013.01); *B60W 30/182* (2013.01); *B60W 50/14* (2013.01); *G05B 13/027* (2013.01); *G06V 20/56* (2022.01); *B60W 2050/143* (2013.01); *B60W 2050/146* (2013.01); *B60W 2420/52* (2013.01); *B60W 2520/28* (2013.01); *B60W 2520/30* (2013.01); *B60W 2552/40* (2020.02); *B60W 2710/06* (2013.01); *B60W 2710/1005* (2013.01)

(58) Field of Classification Search
CPC .. B60W 30/02; B60W 30/182; B60W 40/068; B60W 50/14; B60W 2552/40; B60W 2050/143; B60W 2050/146; B60W 2420/52; B60W 2520/28; B60W 2520/30; B60W 2710/06; B60W 2710/1005; G06V 20/56; G05B 13/027
See application file for complete search history.

(56) References Cited

U.S. PATENT DOCUMENTS

| | | | |
|---|---|---|---|
| 2015/0251659 A1* | 9/2015 | Fischer | ................... B60T 8/171 382/104 |
| 2019/0251370 A1* | 8/2019 | Askeland | ............. G06V 10/449 |
| 2021/0188227 A1* | 6/2021 | Jung | ...................... B60T 8/171 |
| 2021/0261159 A1* | 8/2021 | Pazhayampallil | .... B60W 30/09 |

\* cited by examiner

*Primary Examiner* — Edwin A Young
(74) *Attorney, Agent, or Firm* — NovoTechIP International PLLC (57) ABSTRACT

The present disclosure in some embodiments provides a method and apparatus which utilize a learning model based on deep learning for enabling a vehicle to autonomously estimate a road surface condition by using a deep learning-based learning model, determine a terrain mode optimized for the road surface being traveled by the vehicle, and control respective in-vehicle modules and thereby automatically control the terrain mode.

14 Claims, 6 Drawing Sheets

METHOD AND APPARATUS FOR CONTROLLING TERRAIN MODE USING ROAD CONDITION JUDGEMENT MODEL BASED ON DEEP LEARNING

CROSS-REFERENCE TO RELATED APPLICATIONS

This application is based on, and claims priority from, Korean Patent Application Number 10-2020-0107699, filed Aug. 26, 2020, the disclosure of which is incorporated by reference herein in its entirety.

BACKGROUND OF THE INVENTION

1. Field of the Invention

The present disclosure in some embodiments relates to a method and an apparatus for controlling a terrain mode by using a deep learning-based road condition judgment model. More specifically, the present disclosure relates to a method and an apparatus for controlling a terrain mode by using a deep learning-based pre-trained road condition judgment model and road surface data obtained from a camera.

2. Discussion of Related Art

The statements in this section merely provide background information related to the present disclosure and do not necessarily constitute prior art.

The driving performance of a vehicle changes in response to various conditions of road surfaces such as a wet road, an unpaved or off-road, a sandy and muddy road, and a snow-covered road. Automobile manufacturers have conducted research and development of electronic control units installed in vehicles so that vehicles can actively respond to various road surface conditions and improve driving performance.

The result is a terrain mode control technology commercially made available for allowing the vehicle driver to select a particular terrain mode corresponding to the current surface condition of the road being traveled and thereby control the drive system, the shift time for shifting a transmission gear, and the brake system of the vehicle.

The terrain mode control technology is performed by a process including determining a road surface condition by a driver using naked eyes, selecting a particular terrain mode by using a jog-shuttle dial, and changing the operation state of the respective in-vehicle modules according to the selected terrain mode. The jog-shuttle dial refers to one of the various types of in-vehicle physical buttons that can be attached, but is switchable to another type of button, in the vehicle manufacturing process.

However, the conventional terrain mode control technology requires the driver to manually determine the road surface condition by using the naked eyes, requires additional manipulation of the driver to change the terrain mode, and needs a dedicated device such as a physical button or software button to be provided in the vehicle, resulting in a web of limitations.

Currently, automobile-related technologies are developing toward realizing an autonomous vehicle that performs self-driving, when the conventional terrain mode control technology takes human intervention at various stages performed, working counter to implementing an advanced autonomous driving technology, which is disadvantageous.

Therefore, as a base technology for implementing level 4 or higher advanced autonomous driving, a technology is needed wherein the vehicle can engage more actively with controlling the terrain mode and can control the autonomous driving assistance function.

BRIEF SUMMARY OF THE INVENTION

According to at least one embodiment, the present disclosure provides a method of automatically controlling a driving state of a vehicle in a terrain mode optimized for a road surface, including obtaining road surface data from one or more cameras mounted on the vehicle by a captured image of the road surface being traveled by the vehicle, estimating a road friction coefficient corresponding to the road surface by inputting the road surface data into a deep learning-based learning model that is pre-trained, determining terrain modes optimized for road surfaces being traveled by the vehicle by using the road friction coefficient, and generating optimal terrain mode information, and controlling one or more in-vehicle modules based on the optimal terrain mode information.

According to another embodiment, the present disclosure provides a method of assisting a vehicle to control a terrain mode, including obtaining road surface data from one or more cameras mounted on the vehicle by a captured image of the road surface being traveled by the vehicle, estimating a road friction coefficient corresponding to the road surface by inputting the road surface data into a deep learning-based learning model that is pre-trained, determining terrain modes optimized for road surfaces being traveled by the vehicle by using the road friction coefficient, and providing optimal terrain mode information of an optimized terrain mode.

According to yet another embodiment, the present disclosure provides a method of assisting a vehicle to control autonomous driving, including obtaining road surface data from one or more cameras mounted on the vehicle by a captured image of the road surface being traveled by the vehicle, estimating a road friction coefficient corresponding to the road surface by inputting the road surface data into a deep learning-based learning model that is pre-trained, and determining a driving threshold value of the vehicle by using the road friction coefficient, and controlling one or more in-vehicle modules based on the driving threshold value.

According to yet another embodiment, the present disclosure provides an apparatus for automatically controlling a terrain mode of a vehicle, including an estimation unit, a terrain mode determining unit, and a terrain mode control unit. The estimation unit estimate a road surface condition, includes a deep learning-based learning model that is pre-trained, and is configured to obtain road surface data from one or more cameras mounted on the vehicle by a captured image of a road surface being traveled by the vehicle, and to estimate a road friction coefficient corresponding to the road surface by inputting the road surface data into the deep learning-based learning model. The terrain mode determining unit is configured to determine terrain modes optimized for road surfaces being traveled by the vehicle by using the road friction coefficient. The terrain mode control unit is configured to control one or more in-vehicle modules by using the information on the terrain modes.

According to yet another embodiment, the present disclosure provides a computer program stored in a computer-readable medium for executing steps respectively included in the method of automatically controlling a driving state of the vehicle in terrain modes optimized for road surfaces.

DETAILED DESCRIPTION OF THE INVENTION

The present disclosure in at least one embodiment seeks to provide a technique for allowing a vehicle to autonomously determine the road surface condition without driver intervention by using a deep learning-based learning model trained in advance and to change the driving state of the vehicle in response to various road surface conditions.

The present disclosure in another embodiment seeks to assist a vehicle in performing a terrain mode control by determining road surface conditions even under the usual and non-critical driving situations not amounting to an electronic stability control (ESC) intervention and by determining terrain modes optimized for the road surfaces and then providing the terrain-mode information to the driver.

The present disclosure in yet another embodiment seeks to provide an apparatus for controlling terrain mode to save the vehicle manufacture from the need for installing separate physical buttons on the vehicle to assist the driver in manipulating the vehicle, thereby lowering the vehicle manufacturing cost and securing a free space inside the vehicle to offer more convenience for the driver.

Some exemplary embodiments of the present disclosure are described below with reference to the accompanying drawings. In the following description, like reference numerals preferably designate like elements, although the elements are shown in different drawings. Further, in the following description of some embodiments, a detailed description of known functions and configurations incorporated herein will be omitted for the purpose of clarity and for brevity.

Additionally, alphanumeric codes such as first, second, i), ii), a), b), etc., in numbering components are used solely for the purpose of differentiating one component from the other but not to imply or suggest the substances, the order, or sequence of the components. Throughout this specification, when parts "include" or "comprise" a component, they are meant to further include other components, not excluding thereof unless there is a particular description contrary thereto. The terms such as "unit," "module," and the like refer to units for processing at least one function or operation, which may be implemented by hardware, software, or a combination thereof.

There are recent functional improvements in estimating physical information out of image data based on a deep learning technique. The present disclosure in some embodiments provides a new scheme of using such information estimating function as a basis for rendering a vehicle to self-determine road conditions and control the driving state autonomously.

In more detail, the present disclosure in some embodiments provides an apparatus and a method including calculating road surface friction coefficient information by an estimation unit for road surface condition by using a deep learning-based learning model and controlling engine output, vehicle driving direction, braking speed, braking timing, and other factors involving no driver intervention. Further provided are the proposed uses of the present disclosure.

On the other hand, although some embodiments of the present disclosure describe a driving state control method in an autonomous driving or semi-autonomous driving vehicle for the convenience of description, the embodiments apply to a variety of means of transportation equipped with a camera and an electronic control unit (ECU).

The following description of the present disclosure to be given by referring to the accompanying drawings is intended to describe exemplary embodiments of the present disclosure rather than to represent the only embodiments in which the present disclosure can be practiced.

Figure 1A:
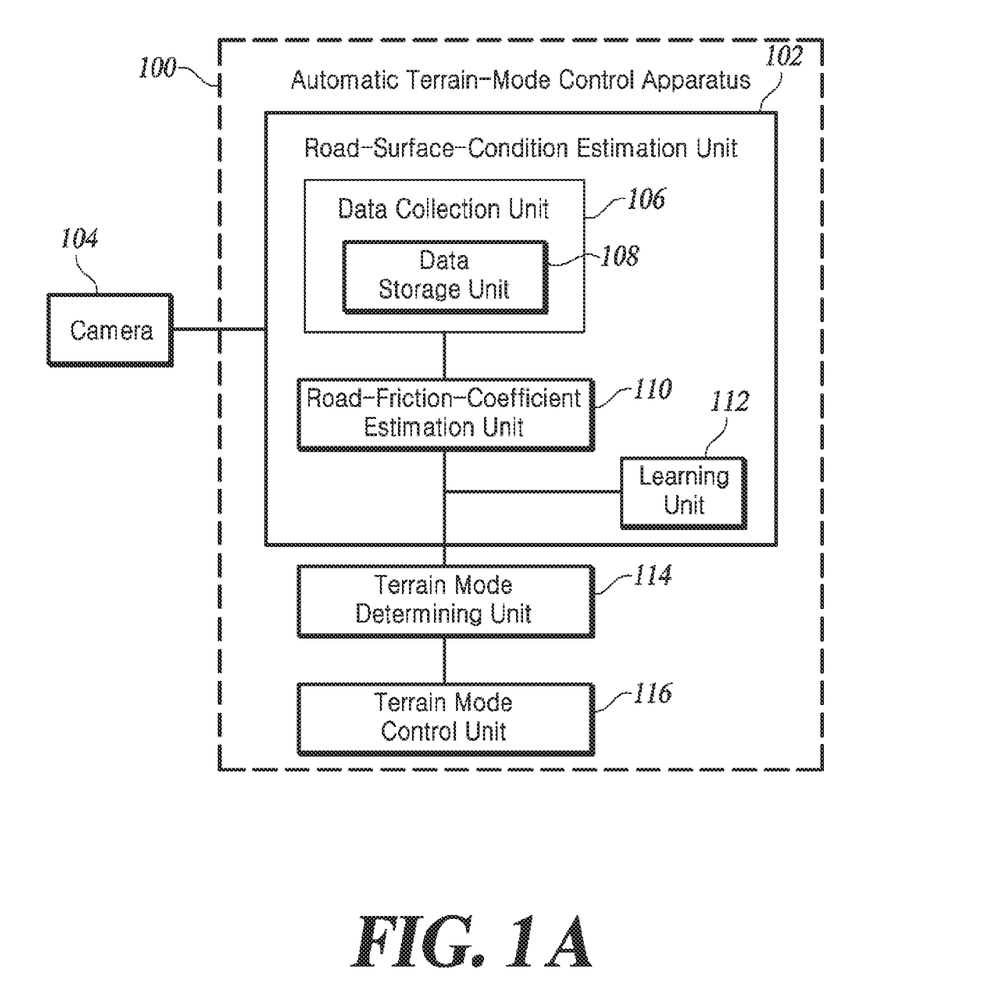
FIG. 1A is a block diagram of an automatic terrain-mode control apparatus according to at least one embodiment of the present disclosure.

FIG. 1A is a block diagram of an automatic terrain-mode control apparatus 100 according to at least one embodiment of the present disclosure.

The automatic terrain-mode control apparatus 100 according to this embodiment includes all or some of a road-surface-condition estimation unit 102 generally composed of three units of a data collection unit (DCU) 106, a road-friction-coefficient estimation unit 110, and a learning unit 112, a terrain mode determining unit 114, and a terrain mode control unit 116.

The automatic terrain-mode control apparatus 100 shown in FIG. 1A is according to at least one embodiment of the present disclosure, and all blocks shown in FIG. 1A are not essential components. In another embodiment, some blocks included in the automatic terrain-mode control apparatus 100 may be added, changed, or deleted. For example, provided a communication unit (not shown) capable of communicating with the driver is added between the terrain mode determining unit 114 and the terrain mode control unit 116, the automatic terrain-mode control apparatus 100 may operate as an apparatus for assisting control of terrain mode, to provide the driver with terrain-mode information of the terrain mode optimized for the surface condition of the road being traveled and control the respective in-vehicle modules according to the terrain mode responsively selected by the driver.

The automatic terrain-mode control apparatus 100 obtains road surface data, estimates the road friction coefficients, determines suitable terrain modes for the road surfaces, and makes a driving state change in response to various terrains. The terrain modes refer to driving states preset by an automobile manufacturer in the respective in-vehicle terrain mode controllers after calculating reference values optimized for different road surfaces and using the calculated reference values for presetting the driving states. When the driver or the system selects a particular terrain mode among various terrain modes, each in-vehicle terrain mode controller may change the driving state to a preset reference value.

The following describes the respective components included in the automatic terrain-mode control apparatus 100.

The road-surface-condition estimation unit 102 transmits, to the terrain mode determining unit 114, road friction coefficient information estimated by using the road surface data obtained from a camera 104 and a learning model based on deep learning. The road-surface-condition estimation unit 102 may be an electronic control unit that trains the deep learning-based learning model.

The camera 104 is mounted on one side of the vehicle to provide road surface data such as an image or video capture of a peripheral area of the vehicle. The data collection unit 106 may obtain road surface data from the camera 104 and include a data storage unit 108 for storing the obtained road surface data. In another embodiment, further to collecting the road surface data of the camera 104, the data collection unit 106 may obtain and store road surface data from a RADAR or LiDAR (both not shown) that is mounted on one side of the vehicle to emit a signal to an object around the vehicle and analyze the signal reflected from the object.

The road-friction-coefficient estimation unit 110 estimates road friction coefficient information by using road surface data corresponding to a feature related to road conditions, temporarily stores the estimated road friction coefficient information in a memory such as a random access memory (RAM) and then transmits the road friction coefficient to the terrain mode determining unit 114 through a controller area network (CAN) bus.

The learning unit 112 obtains road surface data from the camera, RADAR, or LiDAR and generates labeling data by labeling the road friction coefficient on the road surface data. Thereafter, the learning unit 112 trains the deep learning-based learning model by using the labeling data. In at least one embodiment of the present disclosure, the learning unit 112 is implemented as a separate stand-alone device that is interlocked with the road-surface-condition estimation unit 102.

The terrain mode determining unit 114 determines a terrain mode optimized for the surface of the road being traveled based on the road friction coefficient received from the road-surface-condition estimation unit 102. For example, when the terrain mode determining unit 114 determines that the surface of the road being traveled is a wet road as a result of comparing the road friction coefficient provided from the road-friction-coefficient estimation unit with the road friction coefficients preset for different road surfaces, it may transmit the terrain-mode information to the terrain mode controller 116 to change the driving state into preset low engine power.

The terrain mode control unit 116 uses the terrain mode as a basis for controlling such respective components in the drive system and brake system as an engine control unit (ECU), an electronic stability control (ESC), and a transmission control unit (TCU) which are not shown. For example, the ECU may change the engine output to a preset engine mapped value according to the terrain mode selected by the terrain mode determining unit 114. The ESC operates a preset traction control system (TCS) controller according to the terrain mode selected by the terrain mode determining unit 114. The TCU may control the vehicle transmission gear at a preset shift time according to the terrain mode selected by the terrain mode determining unit 114.

Figure 1B:
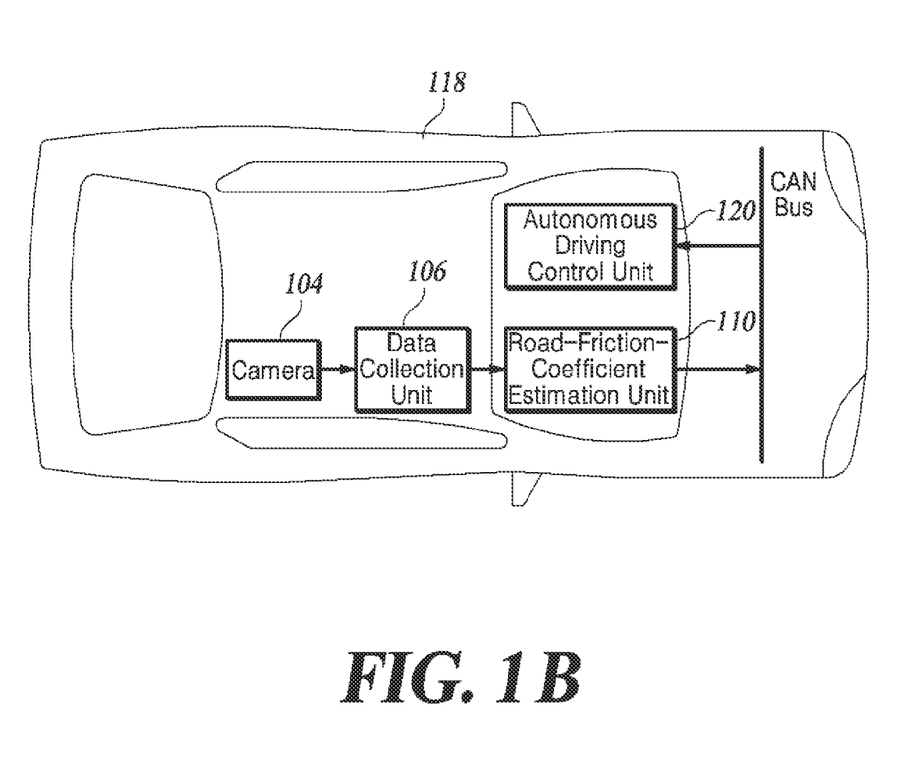
FIG. 1B is a diagram illustrative of components related to a method of assisting autonomous driving control of a vehicle, according to at least one embodiment of the present disclosure.

FIG. 1B is a diagram illustrative of components related to a method of assisting autonomous driving control of a vehicle, according to at least one embodiment of the present disclosure.

The vehicle 118 equipped with an autonomous driving control unit 120 estimates the road friction coefficient by using road surface data obtained from the camera 104 and uses the autonomous driving control unit 120 to control the respective in-vehicle modules. The operation of the autonomous driving control unit-equipped vehicle 118 will be described below with FIG. 4B.

Figure 2:
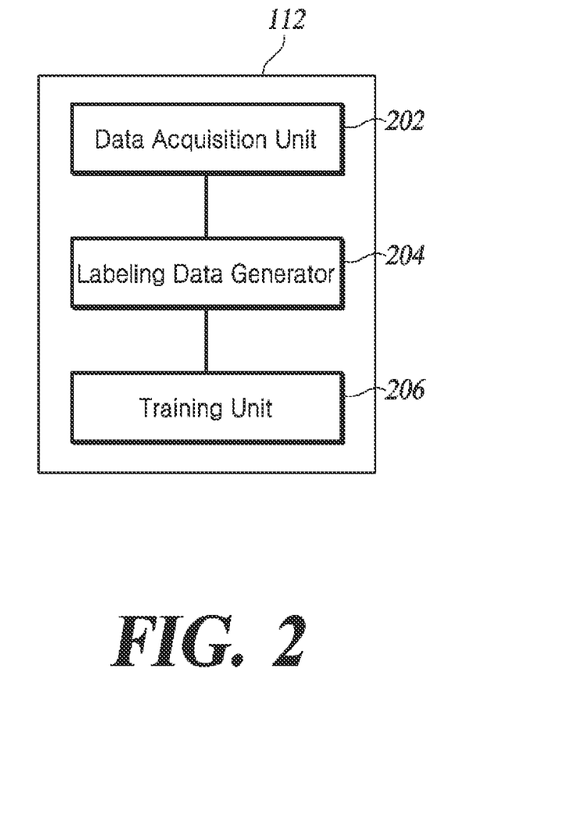
FIG. 2 is a block diagram of a deep learning-based learning unit according to at least one embodiment of the present disclosure.

FIG. 2 is a block diagram of a deep learning-based learning unit according to at least one embodiment of the present disclosure.

The following describes, by referring to FIG. 2, the learning unit 112 according to at least one embodiment of the present disclosure.

The learning unit 112 according to at least one embodiment includes all or some of a data acquisition unit 202, a labeling data generator 204, and a training unit 206.

The data acquisition unit 202 collects learning data for training the deep learning-based learning model.

The data acquisition unit 202 obtains the road friction coefficient collected for the road surface being traveled from the road-friction-coefficient estimation unit 110. In another embodiment, the data acquisition unit 202 obtains, from the ESC, a road friction coefficient calculated based on a wheel speed and wheel torque value of a wheel mounted on the vehicle.

The data acquisition unit 202 collects the road surface data of the camera 104, which correspond to road friction coefficients obtained from the road-friction-coefficient estimation unit 110 in a road friction coefficient acquisition stage performed as part of a learning data collection process for training the deep learning-based learning model.

Here, the road surface data from the camera 104 are captured images of road surface regions located in the front of the vehicle, wherein a certain distance is present between the road surface region in the image and the vehicle. Based on this fact, the data acquisition unit 202 according to at least one embodiment considers the distance between the road surface region in the image and the vehicle, e.g., the tire of the vehicle when collecting the road surface data of the camera 104 to allow the collection of accurate road surface data corresponding to the relevant road friction coefficient.

On the other hand, in at least one embodiment of the present disclosure, the data acquisition unit 202 selectively collects, along with the road friction coefficients, the road surface data corresponding to the relevant road friction coefficient exclusively when event information is collected from the road-friction-coefficient estimation unit 110. In other words, the data acquisition unit 202 may be responsive to event information when detected from the data transmitted by the road-friction-coefficient estimation unit 110 for determining the road friction coefficient as being highly reliable, accordingly extracting the road friction coefficient, and collecting the road surface data corresponding to the extracted road friction coefficient. At this time, the data acquisition unit 202 may specify and obtain, as the road friction coefficient, a value between 20 ms to 1 s in the data to accurately extract the road friction coefficient. The data acquisition unit 202 may skip data of the initial 1 s and the last 1 s, which possibly include event information.

On the other hand, in at least one embodiment of the present disclosure, the event information is generated by the road-friction-coefficient estimation unit 110 exclusively when a preset event situation occurs in association with the road friction coefficient learning. In this case, the preset event situation may be determined depending on the prediction accuracy of the road friction coefficient calculated by the road-friction-coefficient estimation unit 110 when the corresponding event situation occurs. For example, the road-friction-coefficient estimation unit 110 may set
an event situation out of a situation in which a preset threshold of prediction accuracy is equaled or exceeded by the prediction accuracy of the calculated road friction coefficient.

The data acquisition unit 202 may perform data pre-processing on the collected road surface data. For example, the data acquisition unit 202 may detect a road surface region in the collected road surface data, and it may extract and provide image data exclusively corresponding to the detected road surface region. This has the effect of simplifying the operation in the training process to be performed later by reducing the pixel region to be calculated.

The labeling data generator 204 serves to obtain the road surface data and the road friction coefficient from the data acquisition unit 202 and to use the same as a basis for generating learning data for training a learning model.

In at least one embodiment of the present disclosure, the labeling data generator 204 generates labeling data based on the road surface data and the road friction coefficient obtained from the data acquisition unit 202 and provides the generated labeling data as learning data.

For example, the labeling data generator 204 may generate labeling data by labeling the road friction coefficient on the collected road surface data.

The training unit 206 uses the labeling data obtained from the labeling data generator 204 as training data to train the deep learning-based learning model. Meanwhile, a specific method of training a learning model by the training unit 206 based on the learning data is common in the relevant technical field, and a detailed description thereof will be omitted.

The training unit 206 according to the present embodiment so operates that the learning model is trained to estimate road friction coefficient information only with the images from the camera 104. In particular, the learning model learns and stores the road friction coefficient measured by the road-friction-coefficient estimation unit 110 for each of the road surface data having different feature information.

The road-friction-coefficient estimation unit 110 includes a learning model that has been trained in advance according to the operation of the learning unit 112 and undergoes a learning process using its pre-trained learning model to estimate a road friction coefficient corresponding to the road being traveled by the vehicle.

The road-friction-coefficient estimation unit 110 estimates the road friction coefficient corresponding to the road surface by applying the road surface data received from the data collection unit 106 to the learning model.

The road-friction-coefficient estimation unit 110 applies the road surface data to the learning model to extract the matching learning data for the road surface data having the same or similar feature information as the road surface data and estimates, based on the extracted learning data, the road friction coefficient. The road-friction-coefficient estimation unit 110 may estimate the current road friction coefficient information out of information on the previous road friction coefficient labeled on the previous road surface data having the same or similar feature information as the road surface data collected at the current time.

Figure 3:
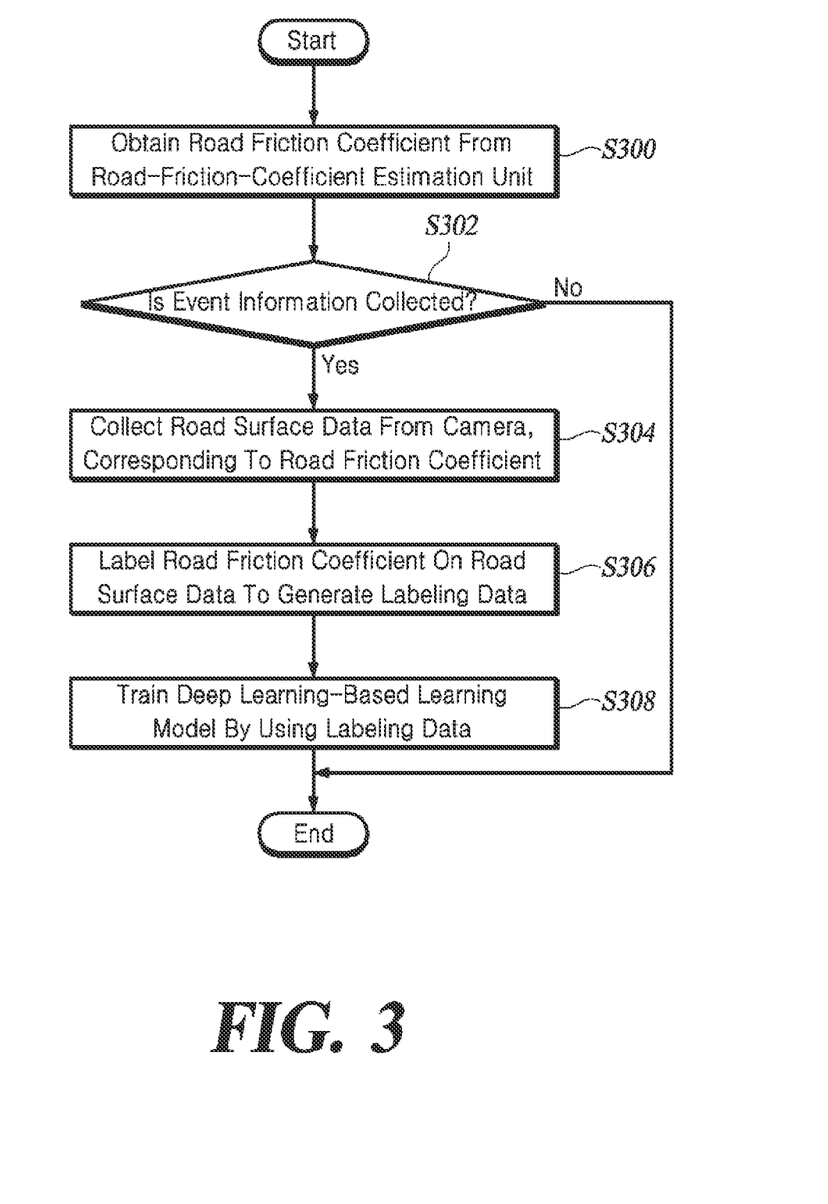
FIG. 3 is a flowchart of a training method for a learning model based on deep learning, according to at least one embodiment of the present disclosure.

FIG. 3 is a flowchart of a learning method for estimating a road friction coefficient according to at least one embodiment of the present disclosure.

The data acquisition unit 202 obtains the road friction coefficient collected for the road surface being traveled by the vehicle from the road-friction-coefficient estimation unit 110 (S300).

The data acquisition unit 202 checks whether event information is collected along with the road friction coefficient (S302). In Step S302, the data acquisition unit 202 may receive event information calculated from the road-friction-coefficient estimation unit 110 exclusively when a preset event situation occurs in association with the road friction coefficient learning. This event information indicates that the collected road friction coefficient is meaningful data for learning.

Upon confirming the collection of event information in Step S302, the data acquisition unit 202 collects road surface data from the camera 104, corresponding to the road friction coefficient obtained in Step S300 (S304). In Step S304, the data acquisition unit 202 renders the accurate road surface data to be collected corresponding to the actual road friction coefficient in consideration of the actual distance between the road surface region in the image and the vehicle.

The data acquisition unit 202 may detect a road surface region from the collected road surface data and extract road surface data exclusively corresponding to the detected road surface region.

The labeling data generator 204 labels the road friction coefficient of Step S300 on the road surface data collected in Step S304 to generate labeling data (S306).

The training unit 206 trains the deep learning-based learning model by using the labeling data generated in Step S306 as training data (S308).

Figure 4A:
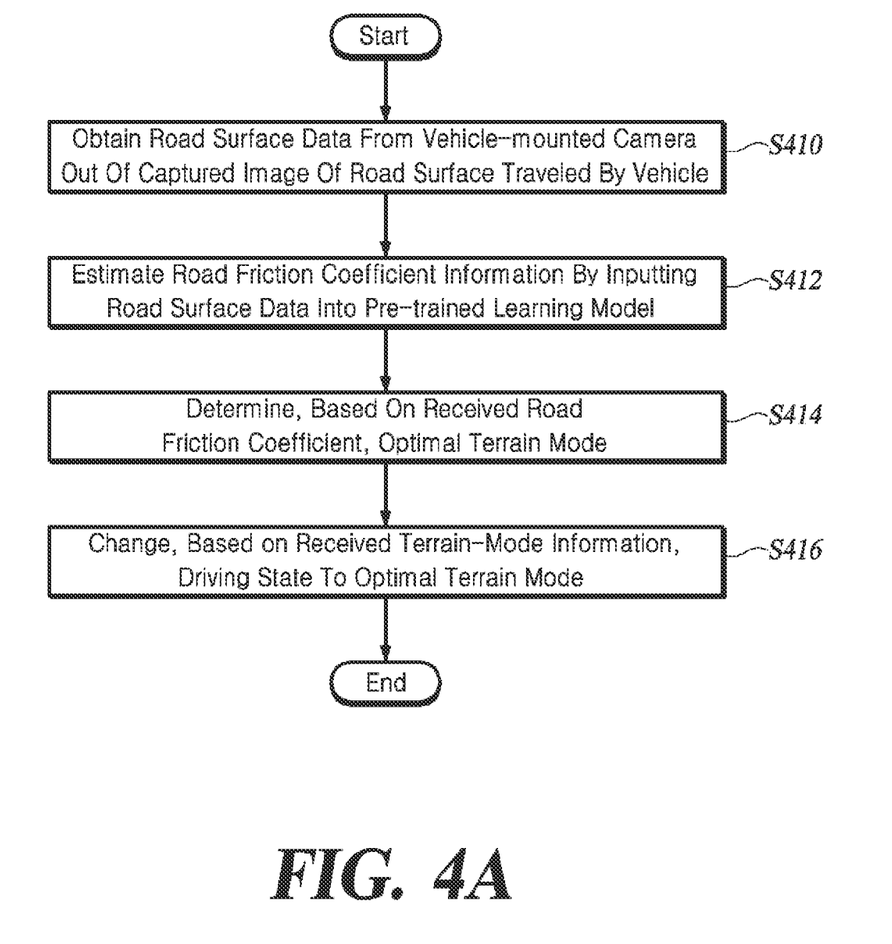
FIG. 4A is a flowchart of a method of automatically controlling a terrain mode, according to at least one embodiment of the present disclosure.

FIG. 4A is a flowchart of a method of automatically controlling a terrain mode, according to at least one embodiment of the present disclosure.

The data collection unit 106 collects road surface data from a vehicle-mounted camera out of a captured image of the road surface being traveled by the vehicle (S410).

The road-friction-coefficient estimation unit 110 estimates road friction coefficient information by inputting the road surface data collected by the data collection unit 106 into a pre-trained learning model (S412).

The road-friction-coefficient estimation unit 110 transmits the road friction coefficient estimated in Step S412 to the terrain mode determining unit 114 through a CAN bus.

The terrain mode determining unit 114 compares the road friction coefficient with the road friction coefficients preset for the respective road conditions and determines the road surface condition of the road being traveled by the vehicle and a terrain mode optimized for the road surface (S414).

The terrain mode determining unit 114 transmits terrain-mode information on the terrain mode optimized for the road surface being traveled by the vehicle to the terrain mode control unit 116.

The terrain mode control unit 116 changes the driving state to one of the reference values preset for respective terrain modes based on the terrain-mode information (S416).

Here, the step of changing the driving state is a process in which an electronic control unit such as an ESC, ECU, or TCU controls the respective in-vehicle modules such as a TCS controller, an engine, and a transmission.

Figure 4B:
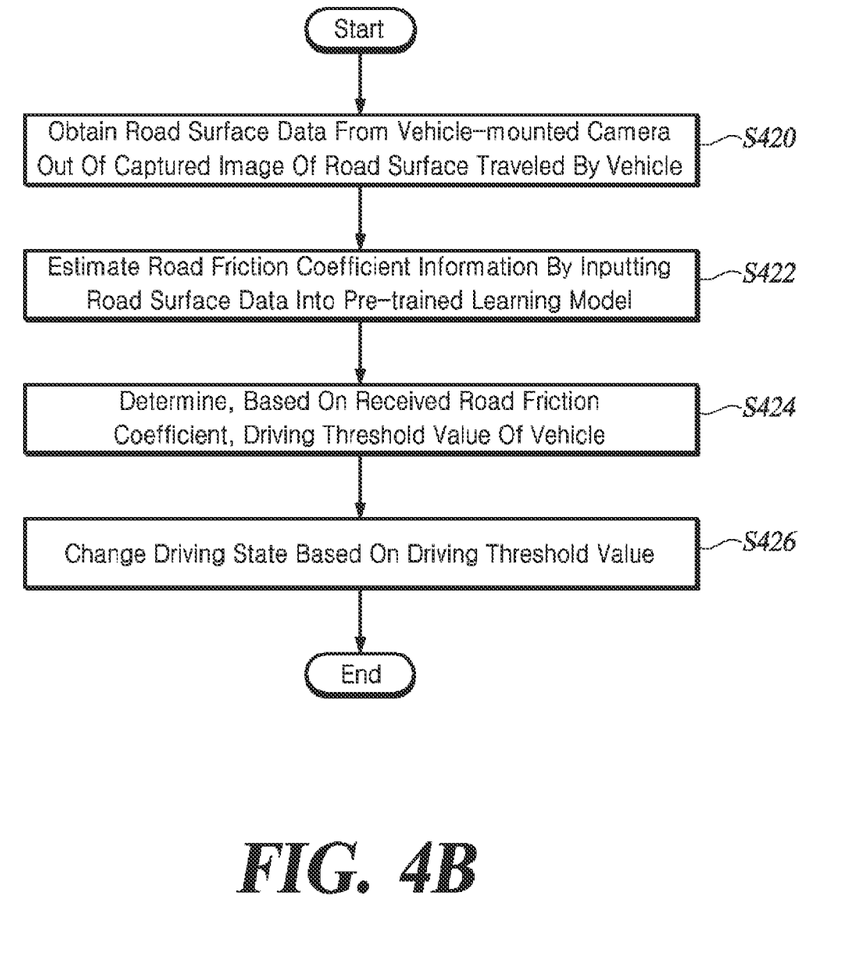
FIG. 4B is a flowchart of a method of assisting autonomous driving control according to at least one embodiment of the present disclosure.

FIG. 4B is a flowchart of a method of assisting autonomous driving control according to at least one embodiment of the present disclosure.

The data collection unit 106 obtains road surface data from a vehicle-mounted camera out of a captured image of the road surface being traveled by the vehicle (S420).

The road-friction-coefficient estimation unit 110 estimates road friction coefficient information by inputting the road surface data obtained by the data collection unit 106 into a pre-trained learning model (S422).

The road-friction-coefficient estimation unit 110 transmits the road friction coefficient estimated in Step S422 to the autonomous driving control unit through the CAN bus.

The autonomous driving control unit 120 compares the road friction coefficient information with information on the road friction coefficients preset for the respective road conditions to determine a road surface condition of the road being traveled by the vehicle and determines a driving threshold value of the vehicle (S424). Here, the driving threshold value refers to threshold values such as the engine power, shift time for shifting a transmission gear, braking time, etc. required to increase fuel efficiency or secure driving safety based on the surface condition of the road being traveled by the vehicle. For example, on a road surface where snow is accumulated by 20 mm or more, the driving threshold value of the engine power may be 50 hundredths of the maximum speed that the vehicle can achieve.

The autonomous driving control unit 120 controls the respective in-vehicle modules based on the driving threshold value for the road surface being traveled by the vehicle (S426).

On the other hand, the autonomous driving control unit 120 may improve autonomous driving performance by changing the driving state of the vehicle autonomously without the intervention of the driver by using the road friction coefficient. For example, the autonomous driving control unit 120 may be a shift pattern control apparatus including a smart cruise control system or a brake control apparatus including a forward collision-avoidance system.

The smart cruise control system refers to a control system responsive to when the driver sets a driving speed for adjusting the driving state of the vehicle by maintaining a constant driving speed according to the driving speed set by the driver and accelerating or decelerating the vehicle as appropriate to the traffic conditions of vehicles running on the relevant road surface.

The shift pattern control apparatus changes the driving speed of the vehicle in response to a traffic volume and a road surface condition by changing an engine output and a shift pattern of a transmission gear through an engine control unit and a transmission control unit.

The forward collision-avoidance system refers to a system that is responsive to the presence of a risk that the vehicle collides with the vehicle in front, that is when the vehicle-to-vehicle distance is measured to be less than a preset threshold for notifying the danger to the driver or rendering the vehicle to autonomously control the brake system, thereby preventing vehicle collisions.

The brake control apparatus reduces the driving speed of the vehicle by controlling a braking initial speed and a braking time to prevent a collision between the subject running vehicle and a vehicle in front.

Although the steps in FIGS. 3, 4A, and 4B are described to be sequentially performed, they merely instantiate the technical idea of some embodiments of the present disclosure. Therefore, a person having ordinary skill in the pertinent art could incorporate various modifications, additions, and substitutions in practicing the present disclosure by changing the sequence described by FIGS. 3, 4A, and 4B or by performing one or more of the steps in FIGS. 3, 4A, and 4B in parallel, without departing from the gist and nature of at least one embodiment of the present disclosure, and hence the steps in FIGS. 3, 4A, and 4B are not limited to the illustrated chronological sequences.

The operation of the automatic terrain-mode control apparatus 100 can be implemented as a computer program and recorded on a computer-readable recording medium. The computer-readable recording medium storing the computer program for implementing the operation of the automatic terrain mode control apparatus 100 includes any type of recording device on which data that can be read by a computer system are recordable. The computer-readable recording medium may include non-transitory media such as a ROM, RAM, CD-ROM, magnetic tape, floppy disk, memory card, hard disk, optical/magnetic disk, optical data storage devices, and the like and transitory medium such as a carrier wave (e.g., transmission through the Internet) and data transmission medium. Further, the computer-readable recording medium can be distributed in computer systems connected via a network, wherein the computer-readable codes can be stored and executed in a distributed mode.

Various implementations of the systems and techniques described herein may be realized by digital electronic circuitry, integrated circuits, field-programmable gate arrays (FPGAs), application-specific integrated circuits (ASICs), computer hardware, firmware, software, and/or their combinations. These various implementations may include those realized in one or more computer programs executable on a programmable system. The programmable system includes at least one programmable processor coupled to receive and transmit data and instructions from and to a data storage system (including volatile memory, non-volatile memory, or any other type of storage system or a combination thereof), at least one input device, and at least one output device, wherein the programmable processor may be a special-purpose processor or a general-purpose processor. For example, the programmable system may be one of a server, a network device, a set-top box, an embedded device, a computer expansion module, a personal computer, a laptop, a personal data assistant (PDA), a cloud computing system, and a mobile device. Computer programs, which are also known as programs, software, software applications, or codes, contain instructions for a programmable processor and are stored in a "computer-readable recording medium."

As described above, according to the present disclosure, one or more cameras mounted on a vehicle obtains road surface data, and the estimation unit for road surface conditions estimates information on a road friction coefficient corresponding to the road surface by inputting the road surface data into the deep learning-based learning model that is pre-trained. This saves the driver from having to manually check the road surface conditions with the naked eyes by enabling the vehicle to autonomously determine the road surface conditions and providing information on the terrain modes corresponding to the road surface conditions to the driver to improve the driver's convenience.

According to the present disclosure, the terrain mode determining unit receive the road friction coefficient information from the road-surface-condition estimation unit and autonomously determine terrain modes optimized for the road surfaces being traveled by the vehicle. Additionally, the terrain mode control unit for controlling one or more in-vehicle modules, including an ESC, an engine control unit (ECU), and a transmission control unit (TCU), autonomously controls the driving state to free the driver of additional manipulation in switching between terrain modes based on information on the optimized terrain modes.

Further, the present disclosure obviates the need to install physical buttons to assist the driver in manipulating the vehicle, resulting in lowered vehicle production costs and a freed space secured inside the vehicle to improve the degree of freedom in the interior design of the vehicle.

Although exemplary embodiments of the present disclosure have been described for illustrative purposes, those skilled in the art will appreciate that various modifications, additions, and substitutions are possible, without departing from the idea and scope of the claimed invention. Therefore, exemplary embodiments of the present disclosure have been described for the sake of brevity and clarity. The scope of the technical idea of the present embodiments is not limited by the illustrations. Accordingly, one of ordinary skill would understand the scope of the claimed invention is not to be limited by the above explicitly described embodiments but by the claims and equivalents thereof.

What is claimed is:

1. A method of automatically controlling a driving state of a vehicle in a terrain mode optimized for a road surface traveled by the vehicle, the method comprising:
obtaining road surface data from a camera mounted on the vehicle, and configured to capture an image of the road surface;
inputting the road surface data into a pre-trained deep learning-based learning model configured to estimate a road friction coefficient corresponding to the road surface;
determining, based on the estimated road friction coefficient, a terrain mode optimized for the road surface, and generating optimal terrain mode information; and
controlling, based on the optimal terrain mode information, an in-vehicle module.

2. The method of claim 1, wherein obtaining the road surface data comprises obtaining, using a RADAR or LiDAR unit mounted on the vehicle, additional road surface data.

3. The method of claim 1, further comprising:
generating labeling data based on the road surface data and the estimated road-friction-coefficient; and
training, using the labeling data as training data, the deep learning-based learning model.

4. The method of claim 1, wherein estimating the road friction coefficient comprises:
measuring, using an electronic stability control (ESC), a wheel speed and a wheel torque value of a wheel mounted on the vehicle; and
estimating, based on the measured wheel speed and wheel torque value, the road friction coefficient.

5. The method of claim 1, wherein:
the in-vehicle module comprises an electronic stability control (ESC), and
controlling the in-vehicle module comprises causing the ESC to operate a traction control system (TCS) controller preset for the terrain mode.

6. The method of claim 1, wherein:
the in-vehicle module comprises an engine control unit (ECU), and
controlling the in-vehicle module comprises causing the ECU to change a preset engine mapping value for the terrain mode.

7. The method of claim 1, wherein
the in-vehicle module comprises a transmission control unit (TCU), and
controlling the in-vehicle module comprises causing the TCU to change a preset shift time for shifting a transmission gear for the terrain mode.

8. The method of claim 1, further comprising:
providing, based on the optimized terrain mode, optimal terrain mode information.

9. The method of claim 8, wherein providing the optimal terrain mode information includes providing the optimal terrain mode information either visually via a display mounted on the vehicle or audibly via a speaker mounted on the vehicle.

10. The method of claim 1, further comprising:
determining, based on the road friction coefficient, a driving threshold value of the vehicle, and controlling, based on the driving threshold value, the in-vehicle module.

11. The method of claim 10, wherein the controlling of the in-vehicle module comprises changing, based on the driving threshold value, a shift pattern of a transmission gear of the vehicle.

12. The method of claim 10, wherein the controlling of the in-vehicle module comprises changing, based on the driving threshold value, a braking initial speed and a braking time of a braking system of the vehicle.

13. A non-transitory computer-readable medium comprising instructions, when executed by a processor, to cause the processor to control a system to perform the method of claim 1.

14. An apparatus for automatically controlling a terrain mode of a vehicle, the apparatus comprising:
an estimation unit configured to:
obtain road surface data from a camera mounted on the vehicle and configured to capture an image of a road surface traveled by the vehicle, and
inputting the road surface data into a pre-trained deep learning-based learning model configured to estimate a road friction coefficient corresponding to the road surface;
a terrain mode determining unit configured to determine, based on the estimated road friction coefficient, a terrain mode optimized for the road surface; and
a terrain mode control unit configured to control, based on the determined terrain mode, an in-vehicle module.

* * * * *